Dec. 2, 1969          J. D. SNYDER          3,481,804
PROCESS FOR FORMING A POLYETHYLENE/POLYPROPYLENE LAMINATE
Filed June 22, 1965
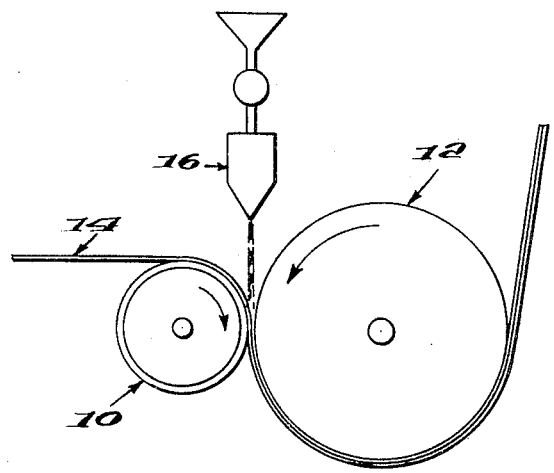
INVENTOR
JOHN D. SNYDER,
BY
AGENT

United States Patent Office 3,481,804
Patented Dec. 2, 1969

---

3,481,804
**PROCESS FOR FORMING A POLYETHYLENE/
POLYPROPYLENE LAMINATE**
John D. Snyder, Orchard Park, N.Y., assignor to E. I. du
Pont de Nemours and Company, Wilmington, Del., a
corporation of Delaware
Filed June 22, 1965, Ser. No. 466,039
Int. Cl. B32b 27/08, 31/20, 31/30
U.S. Cl. 156—82                                    4 Claims

---

ABSTRACT OF THE DISCLOSURE

Process for the preparation of polypropylene-polyethlyene laminar film structures comprising flame treatment of a base film, melt extrusion of a coating layer, and heat treatment of the laminar structure.

---

In the development of suitable film wraps for various food stuffs particularly where the food stuff is prepared for serving while yet in the package it has been found that the rigid requirements of such a wrapping application are met in a laminar type structure comprising a layer of polyethylene tightly adhered to a base layer of polyethylene terephthalate film. Such a film structure is, however, relatively expensive and efforts have been made to develop a lower cost film for this purpose.

Efforts thus far to develop a laminar structure comprising a layer of polyethylene adhered to a base layer of biaxially oriented polypropylene film, for example, have not been successful due primarily to the difficulty in securing an adequate bonding between the two layers which would not become degraded during the heating or cooking treatment in the preparation of the contained food stuff. It is found that when the polyethylene layer is melt extruded on to the polypropylene base layer at an elevated temperature to promote adhesion between the layers there is a tendency for the orientation of the base layer to be destroyed, thus degrading many of the essential strength characteristics of the film. If the polyethylene melt coat is applied to the base layer at too low a surface temperature, inadequate adhesion between the two film layers results. A further requirement, particularly for packaging purposes, is that the laminar structure have good heat seal strength.

It is therefore an object of this invention to provide a process for producing laminar structures of biaxially oriented polypropylene films coated with polyethylene type resins which will have improved adhesion and heat seal characteristics and thus be particularly suitable for the boil-in-bag packaging applications.

According to the present invention, there is provided a process which comprises the steps of : (1) flame pretreating the surface of a biaxially oriented polypropylene film by passing said film, maintained at a temperature between about 45° C. to 80° C., through a flame emanating from the discharge opening of a burner supplied with a gaseous mixture of hydrocarbon fuel and oxygen-enriched air, the fuel equivalence ratio of said gaseous mixture being between 1.0 and 1.30 and the oxygen ratio of said gaseous mixture being between 0.21 and 0.30, the path of the film as it traverses the flame from the burner being located at a distance from the burner less than the length of the unimpeded primary envelope of the flame but not less than the distance below which the velocity of the burning gases escaping from the immediate vicinity of said discharge opening exceeds the burning velocity of the flame, the exposure of the film to the action of the flame being for a time between 0.0005 second and 0.1 second; (2) forming a laminar structure by melt extruding on to the flame pretreated surface of the polypropylene film an ethylene type resin while maintaining the surface temperature of the propylene film between about 75° C. and a temperature 10° C. below the deorientation temperature of the polypropylene film; and (3) heating the laminar structure to a temperature between 10° C. below the deorientation temperature and a temperature just below the deorientation temperature of the polypropylene film.

The process of this invention involves two distinct operations. Initially a polymer is melt extruded on to a pretreated biaxially oriented polypropylene sheet. In this initial operation certain criteria must be attained. First of all the polymer must adhere, as a coating, to the polypropylene sheet. However, at the same time the physical strength properties of the polypropylene sheet must not be degraded. Both of these criteria can be satisfied by (1) using a polypropylene sheet that has been pretreated to promote coating adhesion and (2) critically limiting the maximum surface temperature of the polypropylene sheet.

Thus, in the initial coating operation the maximum surface temperature of the polypropylene sheet is controlled to never exceed a temperature of 10° C. below the polypropylene sheet deorientation temperature. The deorientation temperature as used in this invention refers to the lowest temperature at which the polypropylene sheet will begin to lose its biaxial orientation. Correspondingly, this temperature is the lowest temperature at which initial orientation of the polypropylene can be effected.

By maintaining the polypropylene sheet temperature at at least 10° C. below the deorientation temperature it is certain that in the initial coating operation the polypropylene sheet will undergo no deorientation and resultant diminishing of the strength characteristics. Also, in order to assure adequate initial coating adhesion the polypropylene surface temperature is maintained above 75° C. The use of a polypropylene sheet which has been pretreated to promote adhesion is an essential requirement. This assures adequate initial coating adhesion at a temperature sufficiently below the deorientation temperature that there is no risk of the polypropylene sheet degrading in strength characteristics.

A convenient manner by which this initial operation can be accomplished is illustrated in the attached drawing. A pair of adjacent parallel counter rotating nip rolls 10 and 12 convey a biaxially oriented polypropylene sheet 14 in the direction indicated. A melt extruder 16 issues molten polymer as a film which drops through an air gap and contacts the polypropylene sheet substantially at the nip of the rolls 10 and 12. Thus, the polymer film contacts the polypropylene sheet and the roll 12 at substantially the same time. In maintaining the proper polypropylene film temperature it has been found useful to heat roll 10 while chilling roll 12. Naturally the various parameters such as polymer melt temperature, air gap distance, sheet speed, roll diameter, and roll temperature can all be adjusted to control the desired polypropylene surface temperature.

While the above described initial coating operation forms a laminate, a second operation is necessary to increase the coating adhesion and provide the desired firmly bonded structure. The second operation, termed the post heat treatment step, comprises heating the laminate to a temperature very close to the polyproplyene sheet deorientation temperature. This operation can conveniently be accomplished by continuously passing the laminate over the surface of a heated drum. For obtaining an especially durable laminate the necessity of such a post heat treatment step can be readily appreciated. Since this step is independent from the initial melt polymer coating step, the temperature to which the laminate is heated can be controlled with high accuracy. Thus, it is possible to accurately heat the laminate to a temperature that is just below the deorientation temperature while not actually obtaining it. For practical purposes bringing the laminate to within one degree centigrade of the deorientation temperature is very desirable through as much as 10° C. below the deorientation temperature is acceptable.

The post heat treatment step is generally accomplished by continuously passing the laminate between two counter rotating nip rolls, one of which is heated and the other of which merely serves to press the laminate against the heated roll. The laminate is then subsequently conveyed over a portion of the surface of the heated roll. For obtaining optimum coating adhesion and a high heat seal strength, the effective dwell time, defined as the time at which the laminate is at its post heat treatment temperature, is an important parameter. The effective dwell time can be controlled by the speed of the laminate over the heated drum and it has been found that an effective dwell time from about .08 minute to 0.5 minute is desirable. While the initial nip roll pressure in this step is not a critical limitation, pressures between 25 and 60 pounds per lineal inch or width have been used effectively.

As set forth previously it is essential that the polypropylene base sheet be pretreated to promote adhesion. It is, however, additionally necessary that the pretreatment be limited to a particular method. This method is that generally described in application S.N. 231,218 filed Oct. 17, 1962, now abandoned, and for purposes of this invention termed the flame pretreatment method. This method basically involves treating the surface of the polypropylene film by continuously passing the film through a flame emanating from a discharge opening. The burner is supplied with a gaseous mixture that results in a flame that is substantially neutral to slightly reducing in its action. To insure such a flame it is preferable that the fuel equivalence ratio of the gaseous mixture be maintained within the range of from 1.00 to 1.15. However, satisfactory adhesion of the coating subsequently applied to the flame-treated film may be obtained with a fuel equivalence ratio as low as 1.0 and a high as 1.30. It is further required that the oxygen ratio of the gaseous mixture be maintained above 0.21 and preferably within the range of from 0.25 to 0.30. Little benefit is to be gained from operating at higher oxygen ratios, and at ratios approaching 0.21, the adhesion values between the base and the polymer coating diminishes. Propane is preferred as the fuel gas for the flame treatment, but the process is operable with other parafinic and olefinic hydrocarbon fuels such as butane, ethane, ethylene, and the like or with a mixture of such gases.

Furthermore, in order to achieve satisfactory flame treatment that surface of the film undergoing treatment should be spaced from the discharge opening of the burner a distance less than the length of the unimpeded primary envelope of the flame but not less than the distance below which the velocity of the burning gases escaping from the immediate vicinity of the discharge opening exceeds the burning velocity of the flame. In treating polypropylene film, a distance of between about 3 mm. and about 4 mm. from the film surface to the discharge opening of the burner, said opening being a slot of about 100 mils wide and of a length commensurate with the width of the film, has given optimum results. The optimum distance will of course, vary with variations in the velocity of the burning gases issuing from the burner opening, and hence with the size of the flame, as well as with film speed.

The film supporting surface, conveniently a drum, in contact with the surface of the film directly opposite the surface of film undergoing flame treatment should be maintained at a temperature within the range of from 45° C. to 80° C. The time during which the film surface is exposed to the action of the flame may vary from as little as 0.0005 of a second to as long as 0.1 of a second.

The expression "fuel equivalence ratio" employed herein in defining the gaseous mixture supplied to the burner is the ratio of the amount of hydrocarbon fuel present in the gaseous mixture supplied to the burner to the amount of hydrocarbon fuel necessary for complete stoichiometric combustion. The term "stoichiometric" characterizes the proportion of substances (or energy) exactly right for a specific chemical reaction with no excess of any reactant or product.

The expression "oxygen ratio" is the ratio of the total amount of oxygen present in the gaseous mixture supplied to the burner to the total amount of non fuel components in the mixture, said components including chiefly oxygen and nitrogen.

The "primary envelope" of a stable, self-sustaining flame used in carrying out the process of this invention is readily discerned as the luminous, pale blue inner portion of the flame near the discharge opening of the burner (roughly conical in shape for a circular discharge opening and wedge-shaped for a rectangular discharge opening) and is readily distinguished from the fainter, less luminous secondary sheath or envelope surrounding it. By "the length of the unimpeded primary envelope" is meant the distance from the discharge opening of the burner to the tip of the primary envelope of the flame when the burner is so positioned that the flame burns freely and the primary envelope is not distorted by impingment on any surface or by the proximate passage of any surface.

Obviously, the optimum process conditions of this invention are dependent upon the particular polypropylene base sheets and the particular polymer coatings used. Since biaxially oriented polypropylene sheets are available with a variety of densities and, consequently, different orientation temperatures, the optimum process temperatures will vary accordingly. U.S. Patent 3,141,912 discloses a preferred process for biaxially orienting polymeric film and particularly sets forth suitable polypropylene sheets useful in this invention and their respective orientation temperature ranges.

Similarly, polyethylene has been found to be most useful for the coating layer. However, other ethylene type resins such as the following copolymers can also be used; ethylene/vinyl acetate, ethylene/methyl acrylate, ethylene/methylmethacrylate, and copolymers of ethylene with methacrylic acid which are subsequently partially neutralized with a metal hydroxide such as those of sodium potassium.

When polyethylene is used as the polymer coating it is desirable that it have a density between about 0.90 gm./cc. and 0.94 gm./cc. at 25° C. and preferably 0.90 to 0.925, and a melt index between about 2.5 and 10 and preferably 3.5 to 5.5. For this invention the density is determined by preparing the sample as described in ASTM 1248–60T and measuring its density following the method of ASTM–D1505–57T. The melt index is determined as described in ASTM D1328–52T. Additionally, it has been found desirable to maintain the polymer melt temperature, before extrusion on to the polypropylene sheet, between 275° C. and 350° C. A lower temperature appeared to result in a subsequent degradation in the adhesion to the base layer while a higher temperature appeared to result in degradation of the polymer being applied.

The following example illustrates a preferred method of this invention.

EXAMPLE 1

A one mil thick polypropylene film biaxially oriented as described in U.S. Patent 3,141,912 and having a density of 0.9092 gm./cc. and a deorientation temperature in the range of 135° C.–160° C. was given the following flame pretreatment: the polypropylene film maintained at 75° C., was passed at 350 feet/min. through a flame emanating from a burner with a 100 mil width and placed 3.0 millimeters from the film. Propane was used as the fuel with the fuel equivalence ratio and oxygen ratio being 1.05 and 0.278, respectively. The length of unimpeded primary flame envelope was about 4 millimeters and the exposure time of the film to the flame was about 0.0014 sec.

Subsequently, a 2 mil thick polyethylene coating having a density of 0.920 and melt index of 4.0 was applied to the treated polypropylene film using the equipment schematically shown in FIGURE 1. This was accomplished by extruding the polyethylene resin at a melt temperature of 330° C. through a two inch air gap into the nip of the two rolls 10 and 12.

In the above described coating operation roll 10 was 7 inches in diameter and was held at 112° C. while roll 12 was 12½ inches in diameter and held at 40° C. The polypropylene film travelled at 25 feet/min. over ¼ of the circumferential surface of roll 10 and the laminate over ½ the circumferential surface of roll 12. The surface temperature of the polypropylene film never exceeded a maximum of 90° C.

After the coating operation the laminar structure was passed at 16 feet per minute through a pair of nip rolls, one of which was heated, the rolls being pressed together at a pressure of 40 pounds per linear inch of width. The laminate was drawn out over the heated roll, maintained at a temperature of 130° C., such that the effective dwell time at this temperature was 0.09 min.

The above described polyethylene/polypropylene laminate was tested for heat seal strength and for adhesion of the polyethylene layer to the polypropylene layer. Two different adhesion tests were conducted; one with the laminate in the dry state and the other with the laminate in the wet state (i.e.: tested after being in a tomato oil sauce at 100° C. for one hour).

For comparison two other samples were also tested for heat seal strength and adhesion. One of these designated as control #1, was prepared in accordance with Example 1 except that the post heat treatment step was omitted. The other sample, designated as Example 2, was prepared identical with Example 1 except that the dwell time of the post heat treatment step was 0.15 min. The following table presents the results of these tests.

| Film | Dwell Time (min.) | Heat Seal (g.) | Dry Adhesion (g.) | Wet Adhesion (g.) |
| --- | --- | --- | --- | --- |
| Example 1 | 0.09 | 780 | 230 | 345 |
| Example 2 | 0.15 | 950 | *CNP | 340 |
| Control 1 | None | 1,990 | *CNP | 70 |

*Cannot peel.

The method by which thes tests were conducted is as follows: Heat seal strength is measured by cutting a piece of the coated film 4" by 10" with the grain running in the long or machine direction into two pieces 4" by 5" each. The two pieces are superimposed so that opposite surfaces are in contact. The two pieces of superimposed film are then sealed together at each end at right angles to the grain. A ¾" wide sealing bar heated to a temperature of 125° C. at 20 p.s.i. pressure contacts the ends for ¼ second. The sealed sheets are then cut in half at right angles to the grain. From the center of each of the two resulting pieces, two 1½" wide strips parallel to the grain are cut. The resulting four sets of strips are tested by opening at the free ends, placing them in a Suter testing machine and pulling them apart.

The highest force in grams required to pull the strips apart is taken as a measure of the heat seal bond strength.

The adhesion tests entail an attempt to lift the coating from the base film with a sharp edged instrument such as a knife. If the coating cannot be lifted without rupture of the coating itself, the bond is labelled "cannot peel" (CNP). If the coating can be lifted, a one inch wide strip of adhesive tape is attached to the loosened strip which is then pulled off at an angle of 180°. The actual force required to pull off the strip of coating is recorded.

The term "dry adhesion" refers to the force required to pull the coating off the base layer wherein the laminate has not been subjected to any additional conditioning or testing conditions after lamination.

The term "wet adhesion" refers to the force required to pull the coating off the base layer of a simple laminar structure which has been subjected to exposure to a tomato oil sauce at 100° C. for one hour.

A separate set of experiments were conducted to determine the effect of the flame pretreatment of the base polypropylene film. In these tests, film samples which had been prepared as described in Example 1 but were not flame pretreated showed a dry adhesion of 30 grams per inch and wet adhesion of zero to 10 grams per inch.

What is claimed is:

1. A process for producing a firmly bonded laminar structure suitable for boil-in-bag packaging applications comprising the steps of: (1) flame pretreating the surface of a biaxially oriented polypropylene film by passing said film, maintained at a temperature between about 45° C. to 80° C., through a flame emanating from the discharge opening of a burner supplied with a gaseous mixture of hydrocarbon fuel and oxygen-enriched air, the fuel equivalence ratio of said gaseous mixture being between 1.0 to 1.30 and the oxygen ratio of said gaseous mixture being between 0.21 and 0.30, the path of the film as it traverses the flame from the burner being located at a distance from the burner less than the length of the unimpeded primary envelope of the flame but not less than the distance below which the velocity of the burning gases escaping from the immediate vicinity of said discharge opening exceeds the burning velocity of the flame, the exposure of the film to the action of the flame being for a time between 0.005 second and 0.1 second; (2) forming a laminar structure by melt extruding on to the flame pretreated surface of the polypropylene film a resin selected from ethylene polymers and copolymers while maintaining the maximum temperature of the polypropylene film surface between about 75° C. and a temperature 10° below the deorientation temperature of the polypropylene film; and (3) heating the laminar structure to a temperature between 10° C. below the deorientation temperature and a temperature just below the deorientation temperature of the polypropylene film for an effective dwell time of about 0.08 min. to 0.5 min.

2. The process of claim 1 wherein the ethylene resin is a polyethylene resin having a density between about 0.90 and 0.94 and a melt index between about 2.5 and 10.

3. The process of claim 2 wherein the polyethylene resin has a density between about 0.90 and 0.925 and a melt index between about 3.5 and 5.5.

4. A process for producing a firmly bonded laminar structure suitable for boil-in-bag packaging applications comprising the steps of: (1) flame pretreating the surface of a biaxially oriented polypropylene film having a density of 0.9092 g./cc. by passing said film, maintained at a temperature of about 75° C., through a flame emanating from the discharge opening of a burner supplied with a gaseous mixture of hydrocarbon fuel and oxygen-enriched air, the fuel equivalence ratio of said gaseous mixture being about 1.05 and the oxygen ratio of said gaseous mixture being about 0.278, the path of the film as it traverses the flame from the burner being located at a distance from the burner less than the length of the unimpeded primary envelope of the flame but not less than the distance below which the velocity of the burning gases escaping from the immediate vicinity of said discharge opening exceeds the burning velocity of the flame, the exposure of the film to the action of the flame being for a time of about 0.0014 second; (2) forming a laminar structure by melt extruding on to the flame pretreated surface of the polypropylene film a polyethylene resin at a melt temperature between 275° C. and 350° C. having a density of about 0.920 and a melt index of about 4.0 while maintaining the temperature of the polypropylene film surface at about 90° C.; and (3) heating the laminar structure to a temperature of about 130° C. for an effective dwell time of about 0.09 min. to 0.15 min.

References Cited

UNITED STATES PATENTS

| | | | |
|---|---|---|---|
| 2,795,820 | 6/1957 | Grow et al. | 264—80 |
| 3,068,516 | 12/1962 | Hofer | 264—95 |
| 3,187,982 | 6/1965 | Underwood et al. | 156—244 X |
| 3,255,034 | 6/1966 | Covington et al. | 264—80 X |
| 3,262,808 | 7/1966 | Crooks et al. | 117—47 |
| 3,265,552 | 8/1966 | Berggren et al. | 156—244 |

HAROLD ANSHER, Primary Examiner

T. R. SAVOIE, Assistant Examiner

U.S. Cl. X.R.

156—244; 161—252

PO-1050
(5/69)

UNITED STATES PATENT OFFICE
CERTIFICATE OF CORRECTION

Patent No. 3,481,804    Dated December 2, 1969

Inventor(s)    John D. Snyder

It is certified that error appears in the above-identified patent and that said Letters Patent are hereby corrected as shown below:

Column 3, line 13, "through" should read -- though --. Column 3, line 60, "that" should read -- the --. Column 5, line 61, "thes" should read -- these --. Column 6, line 45, "0.005" should read -- 0.0005 --.

SIGNED AND
SEALED
MAR 10 1970

(SEAL)
Attest:

Edward M. Fletcher, Jr.
Attesting Officer

WILLIAM E. SCHUYLER, JR.
Commissioner of Patents